Patented June 27, 1950

2,512,627

UNITED STATES PATENT OFFICE 2,512,627

PROCESSES FOR PRODUCING COPOLY-TRIAZOLE-AMIDES

James Wotherspoon Fisher and Edward William Wheatley, Spondon, near Derby, England, assignors to Celanese Corporation of America, a corporation of Delaware No Drawing. Application February 6, 1947, Serial No. 726,964. In Great Britain February 13, 1946

11 Claims. (Cl. 260—78)

This invention relates to improvements in the production of polymeric materials, and is more particularly concerned with the production of polymers suitable for the formation of filaments, films and plastic materials.

U. S. application S. No. 609,031, filed August 4, 1945, describes the production of nitrogen-containing polymers from dihydrazides of dicarboxylic acids in presence of hydrazine, e. g. preferably at least 10% by weight of the dihydrazide, over and above that combined in the dihydrazide and also describes using dicarboxylic esters and an amount of hydrazine in excess of two moles for each mole of dicarboxylic ester. U. S. application S. No. 662,628, filed April 16, 1946, describes the production of such polymers from hydrazine and the dicarboxylic acids themselves or their anhydrides, again using more than two moles of hydrazine. Further, U. S. application S. No. 662,628, filed April 16, 1946, describes the production of nitrogen-containing polymers from mixtures of diamides and dihydrazides of dicarboxylic acids with free hydrazine, from dicarboxylic acids, esters or anhydrides with ammonia and hydrazine using more than two moles of total base including more than one mole of hydrazine, from dinitriles of dicarboxylic acids with hydrazine, and from various other combinations of raw materials. Polymers may be produced according to these specifications which possess characteristics, including resistance to degenerative hydrolysis by boiling concentrated hydrochloric acid, which indicate that they contain the 1.2.4-triazole nucleus in the main chain of atoms and terminal groups which are either hydrazide groups or at least after hydrolysing treatment, carboxyl groups, and these polymers are consequently referred to throughout the present specification as substances containing the 1.2.4-triazole nucleus.

The polymers obtained are extraordinarily resistant to hydrolysing agencies such as boiling hydrochloric acid. Presumably the terminal groups of the polymers contain some residual hydrazide or some residual amide groups. Possibly some of the terminal groups are acid hydrazide or amide groups and some are free carboxylic acid groups. Hydrolysis with hydrochloric acid or similar agencies probably converts all the terminal groups to carboxylic acid groups, but does not apparently break down the polymer since the intrinsic viscosity after hydrolysis is substantially the same as before.

We have now found that the polymers obtained as described in the said prior specifications are capable of being further condensed with amide-forming bifunctional monomeric reagents and with linear polyamides to give valuable linear polymers which if of sufficiently high molecular weight are capable of being spun into fibres or are of value for other purposes to which polymers are now applied, such as the production of films, plastic materials, lacquers and the like.

According to the invention, therefore, synthetic linear condensation polymers are produced by a process which comprises reacting a linear polymer containing the 1.2.4-triazole nucleus and obtainable by condensation of a hydrazide of a dicarboxylic acid, with a bifunctional amide-forming substance containing a functional group which is complementary to a terminal group of said polymer. It is to be understood that two groups are complementary in the sense of the present specification, when they react with each other to form an amide group. For the purposes of the present invention, particularly important polymers containing the triazole nucleus are those produced according to the processes of U. S. application S. No. 662,628, filed April 16, 1946, and U. S. application S. No. 609,031, filed August 4, 1945, especially those containing the 4-amino-1.2.4-triazole nucleus.

As pointed out in said applications, polymers containing the triazole nucleus may be obtained by heating a reaction mixture which on complete hydrolysis contains a mixture of a dicarboxylic acid free from reactive groups other than the carboxy groups and a base which is hydrazine or a mixture of hydrazine and ammonia. When the base is hydrazine, there is present more than 2 moles of hydrazine for each mole of dicarboxylic acid, the excess of hydrazine above 2 moles for each mole of dicarboxylic acid being in an amount sufficient to produce a polymer resistant to hydrolysis by hydrochloric acid. Similarly, when the base is a mixture of hydrazine and ammonia, there is present more than 2 moles of hydrazine and ammonia together for each mole of dicarboxylic acid and more than 1 mole of hydrazine for each mole of dicarboxylic acid, the excess of hydrazine and ammonia above 2 moles for each mole of dicarboxylic acid and the excess of hydrazine above 1 mole for each mole of dicarboxylic acid being in an amount sufficient to produce a polymer resistant to hydrolysis by hydrochloric acid.

The process of the invention may be applied to polymers containing the triazole nucleus which have degrees of polymerisation ranging from 2 up to values corresponding, for example, to intrinsic viscosities of 0.7, 0.9 or even higher, but it is of most importance in relation to low polymers of this type, e. g. those of intrinsic viscosity up to about 0.2–0.3. Reference is made to the prior specifications referred to above for details of methods by which such polymers may be produced. Products of very low degree of polymerisation may be obtained by suitable modifications of the processes; thus, for example, a triazole bis-valeric acid may be prepared by heating the sodium salt of adipic mono-hydrazide in an autoclave in the presence of about 10% by weight hydrazine hydrate and treating the product with the theoretical quantity of mineral acid. It will be observed that this triazole bis-valeric acid, although it contains only one triazole nucleus, may be regarded as a dimer of adipic monohydrazide, and it is consequently included within the meaning of the term polymer as employed in this specification. Other triazole dicarboxylic acids of the general formula

where T is a 1.2.4-triazole nucleus and R' and R" are divalent organic radicles, preferably hydrocarbon, e. g. alkylene, radicles, may also be employed.

The polymers containing the triazole nucleus obtained directly by condensation of a dicarboxylic acid dihydrazide or by an equivalent process and having terminal hydrazide groups may be condensed with suitable monomeric bifunctional amide-forming reagents, for example diamines containing at least one hydrogen atom attached to each nitrogen atom of the amino groups, dicarboxylic acids or amide-forming derivatives thereof, amino-carboxylic acids, or mixtures of these substances. Instead of or in addition to monomeric reagents, there may be employed polymeric bifunctional amide-forming reagents, e. g. linear polyamides having terminal amide-forming groups. For example, the polymers containing the triazole nucleus may be condensed with a polymer produced from a diprimary diamine and a dicarboxylic acid, the terminal groups being amino groups or carboxylic acid groups according to the component, if any, which is used in excess. Such polyamides are also preferably of low degree of polymrisation, i. e. they do not possesss fibre-forming properties, and may, for example, be such as are produced by the condensation of one molecular proportion of a diamine with two molecular proportions of a dicarboxylic acid.

It is found that during the polymerisation, when the polymer containing the triazole nucleus is one containing terminal hydrazide groups, the original polymer itself may undergo further condensation to produce a triazole polymer of higher molecular weight than the starting material. This is shown by taking the resulting copoly-amide-triazole and boiling it with hydrochloric acid so as to hydrolyse the amide groups present. There is thus obtained a water-insoluble hydrochloride of a triazole polymer without any amide linkages, and it is found that this polymer may have a higher intrinsic viscosity than the polymeric starting material, thus indicating further polymerisation of the original polymer during the heating with the bifunctional amide-forming reagent.

The proportion of amino groups to carboxylic or equivalent groups in the bifunctional amide-forming substances which are to be condensed with the polymer containing the triazole nucleus may vary considerably. Thus we may condense a poly-aminotriazole with the salt of a diprimary diamine and a dicarboxylic acid which contains amino and carboxy groups in substantially equal proportions, or we may have present an excess of carboxylic acid groups or an excess of amino groups. Thus, for instance, the polyaminotriazole may be condensed with a body of the approximate constitution of 2 moles of dicarboxylic acid to 1 mole of diamine, or it may be condensed with a body of the approximate constitution of 2 moles of diamine to 1 mole of dicarboxylic acid. By starting with a polymer containing the triazole nucleus in which the terminal groups have been completely hydrolysed to carboxylic acid groups, we may condense it with a diamine alone, with a mixture of any proportion of diamine to dicarboxylic acid in which the diamine is in excess or is just equivalent to the dicarboxylic acid or with a linear polyamide having terminal amino groups. Again we may vary the total proportion of bifunctional amide-forming substances to the proportion of starting polymer containing the triazole nucleus. By these means a wide variety of polymers may be produced, and starting with any one polymer containing the triazole nucleus a range of melting points and other properties is attainable. From the point of view of moisture regain in the products, desirable proportion of polymer containing the triazole nucleus to bifunctional amide-forming substance lie between 40:60 and 80:20.

As suitable diamines dicarboxylic acids and amino-carboxylic acids for use as amide-forming monomers, we may mention polymethylene diamines containing at least one hydrogen atom attached to each nitrogen atom, especially diprimary diamines, e. g. tetramethylene diamine, pentamethylene diamine, hexamethylene diamine and decamethylene diamine, glutaric acid, adipic acid, pimelic acid, suberic acid, azelaic acid, sebacic acid, p-phenylene diacetic acid, terephthalic acid and the like, and 6-aminocaproic acid (or its lactam), 7-amino-heptoic acid, 9-amino-nonanoic acid and the like. These substances are also examples of reagents which may be employed for producing polyamides which may serve as starting materials for the process of the present invention.

The following examples illustrate the invention but are not to be considered as limiting it in any way. In particular it is noted that small changes in the conditions of the production of the original polymer or of the polymerisation described therein may make substantial differences to the properties of the products.

*Example 1*

Equal parts by weight of hexamethylene diammonium adipate and of a polyaminotriazole prepared from sebacic dihydrazide and having a melting point of 260° C. and an intrinsic viscosity of 0.52 were heated together in an amount of metacresol equal to the combined weight of the reactants. The heating was carried out for 1 hour at 210–220° C. under nitrogen. The mixture was then poured into excess of acetone which precipitated the polymer as a tough fibrous mass capable of yielding strong filaments and having a melting point, intrinsic viscosity and nitrogen content respectively about 232° C., 0.9 and 19.5%. It was insoluble in water, acetone, methanol, chloroform and benzene, and soluble in cresol and formic acid.

Example 2

Equal parts by weight of hexamethylene diammonium adipate and a polyaminotriazole formed from sebacic dihydrazide and having an intrinsic viscosity of 0.3 were heated, as described in Example 1, in metacresol for 2 hours at 210-220° C. under nitrogen. The resulting solution was precipitated by pouring into acetone, as described in Example 1. The resulting polymer was white, tough and semi-fibrous, had a melting point of 227-330° C. and was capable of yielding long fine filaments. It had intrinsic viscosity and nitrogen content respectively about 0.6 and 17.3%. On hydrolysis with hydrochloric acid, the amide-forming constituents were split off and the resulting regenerated polyaminotriazole had an intrinsic viscosity of about 0.5, compared with an intrinsic viscosity of 0.3 of the starting material. The solubility properties of the copolyamideaminotriazole were the same as those given in Example 1.

Example 3

A mixture of 1 molecular proportion of hexamethylene diammonium adipate and 1 molecular proportion of adipic acid was heated in the melt under nitrogen for an hour at 200° C. Water was evolved and the product was a white brittle mass, melting point 137-140° C., insoluble in water and acetone, and soluble in hot methanol. This body is referred to below as the "Intermediate A."

225 parts by weight of a polyaminotriazole prepared from sebacic dihydrazide having an intrinsic viscosity of 0.3 were mixed with 37 parts by weight of Intermediate A in an amount of metacresol equal to the combined weight of the reactants. The mixture was heated for 4 hours at 210° C. under nitrogen, and the resulting polymer precipitated as described in Example 1. The polymer was a white semi-fibrous mass, having a melting point 195° C., and it possessed very good fibre-forming properties. It was insoluble in water and acetone, slowly soluble in boiling methanol and soluble in cold metacresol and formic acid. It had an intrinsic viscosity of about 0.65. The polyaminotriazole regenerated from the above copolymer as described in Example 2 had an intrinsic viscosity of about 0.59.

Example 4

62 parts by weight of polyaminotriazole prepared from adipic dihydrazide and having an intrinsic viscosity of 0.15 were heated with 37.2 parts by weight of Intermediate A (see Example 3) in an amount of metacresol equal to the combined weight of the reactants. The heating was carried out for 2 hours at 220° C. under nitrogen, and the polymer precipitated in excess acetone, re-dissolved in cold formic acid and precipitated by pouring into excess alkali. The product, which was a white, somewhat plastic mass, readily formed filaments and had an intrinsic viscosity of about 0.55. It was soluble in methanol, cresol and formic acid, and insoluble in acetone. The intrinsic viscosity of the polyaminotriazole regenerated from the copolymer was about 0.40.

Example 5

90 parts by weight of hexamethylene diammonium adipate and 10 parts by weight of a polyaminotriazole prepared from adipic dihydrazide having an intrinsic viscosity of 0.32 and a melting point of about 305-310° C. were heated together in an amount of meta-cresol equal to the combined weight of the reactants for a period of 3 hours at 210-220° C. under nitrogen. The product was a white fibrous mass of melting point 250-255° C., insoluble in water, acetone, and methanol, soluble in cresol and formic acid, had an intrinsic viscosity of about 0.8 and was capable of forming long fine filaments.

Example 6

Example 5 was repeated using an polyaminotriazole prepared from sebacic dihydrazide and having an intrinsic viscosity of 0.3. Here the product had similar properties to the product of Example 5, but its melting point was 240-245° C.

Example 7

A polyaminotriazole was prepared by heating 200 parts by weight sebacic dihydrazide and 41 parts by weight of 50% aqueous hydrazine hydrate in an autoclave for ½ hour at 240° C. and a maximum pressure of 600 lbs. per square inch. The product ("Intermediate B") was a granular, white solid of melting point 235° C., without fibre-forming properties, and of intrinsic viscosity 0.17.

50 parts by weight of Intermediate B and 50 parts by weight of hexamethylene diammonium adipate were heated under nitrogen for 2 hours at 210° C. in an amount of metacresol equal to the combined weight of the reactants. The resulting polymer was precipitated as described in Example 1. It was a tough, white, fibrous mass (melting point, intrinsic viscosity and nitrogen content respectively about 174° C., 0.9 and 19.6%) from which in the molten state good fibres could be drawn. It was insoluble in water, acetone and methanol, and soluble in cresol and formic acid. On hydrolysis as described in Example 2, a polymer of intrinsic viscosity 0.27 was regenerated.

Example 8

A polyaminotriazole, prepared from sebacic dihydrazide, was finely ground and refluxed in concentrated hydrochloric acid for 3 hours. The resulting oily hydrochloride was separated, washed with water and treated with a slight excess of aqueous ammonia to release the polymeric base, which was washed with hot water and dried to yield a powder ("Intermediate C") of melting point about 282° C. and intrinsic viscosity about 0.22. The powder was a polyaminotriazole having terminal carboxyl groups.

100 parts by weight of Intermediate C was heated with 10 parts by weight of hexamethylene diamine under nitrogen for 4 hours at 210° C. in 100 parts of metacresol. The resulting polymer, precipitated as described in Example 1, was a brittle mass capable of forming good filaments from the melt (melting point, intrinsic viscosity and nitrogen content respectively about 170° C., 0.66 and 23.1%). It was insoluble in water and acetone, and soluble in hot methanol cresol and formic acid. Hydrolysis as in Example 2 regenerated a polymer of intrinsic viscosity about 0.24.

Example 9

A polyamide was produced by heating a mixture of 2 molecular proportions of hexamethylene diammonium adipate and 0.2 molecular proportion of adipic acid under a nitrogen for 5 hours at 200-210° C. in an amount of metacresol equal to the combined weight of the reactants, the resulting solution being poured into a large excess of acetone to precipitate the polymer ("Intermediate D"), which had melting point 238-240° C.

and intrinsic viscosity about 0.26, and showed no fibre-forming properties.

50 parts by weight of Intermediate D and 50 parts by weight of Intermediate B (see Example 7) were heated together under nitrogen for 4 hours at 210° C. in an amount of metacresol equal to the combined weight of the reactants, and the product precipitated as described in Example 1. The resulting polymer was a white, fibrous mass, of melting point, intrinsic viscosity and nitrogen content respectively about 184° C., 0.61 and 16.8%, and yielded, from the melt, fibres having good strength and extension. Its solubility properties were similar to those given in Example 7. Hydrolysis of this polymer by the method described in Example 2 regenerated a polymer of intrinsic viscosity about 0.29.

Example 10

Equimolecular proportions of hexamethylene diammonium adipate and adipic acid were dissolved in water and the solution heated under nitrogen for 1½ hours at 200–210° C., during which time the water was rapidly distilled off. On cooling, a white, brittle solid was obtained, and this was extracted with ether to remove unchanged adipic acid and then with methanol to dissolve the fraction ("Intermediate E"), which was shown to be N.N'-diadipyl-hexamethylene diamine, melting point 176° C., equivalent weight 189 (theory 186) nitrogen content about 7.6% (theory 7.53%).

50 parts by weight of Intermediate B (see Example 7) and 25 parts by weight of Intermediate E were heated under nitrogen for 3 hours at 210° C. in an amount of metacresol equal to the combined weight of the reactants, and the product precipitated as described in Example 1 to yield a white, semi-fibrous mass of melting point, intrinsic viscosity and nitrogen content respectively about 205° C., 0.56 and 22.2%. The mass could be melt-spun to give fine filaments of good strength and extension. Its solubility properties were similar to those given in Example 8. Hydrolysis of the product by the method described in Example 2 regenerated a polymer of intrinsic viscosity about 0.22.

Example 11

A polyaminotriazole was prepared by heating 150 parts by weight of adipic dihydrazide and 30 parts by weight of 50% aqueous hydrazine hydrate in an autoclave for 1 hour at 200° C. and a maximum pressure of 220 lbs. per square inch. The product was a sticky, white mass which was washed with cold water and dried to yield a white powder ("Intermediate F") of melting point 215–220° C., intrinsic viscosity about 0.10, and nitrogen content about 34.8%, which had no fibre-forming properties.

30 parts by weight of Intermediate F and 30 parts by weight of Intermediate D (see Example 9) were heated under nitrogen for 4 hours at 210° C. in an amount of metacresol equal to the combined weight of the reactants. The fibrous mass obtained on precipitation of the resulting solution as described in Example 1 was capable of yielding fine filaments of good strength and extension (melting point 220–225° C., intrinsic viscosity about 0.69, nitrogen content about 21.2%). It was insoluble in water and acetone, very slightly soluble in methanol, and soluble in cresol and formic acid.

Example 12

A mixture of 100 molecular proportion of hexamethylene diammonium adipate and 10.5 molecular proportions of hexamethylene diamine was heated under nitrogen for 6 hours at 200–210° C. in an amount of metacresol equal to the combined weight of the reactants. The solution obtained was precipitated by pouring into excess acetone and the product found to be a powdery solid ("Intermediate G"), melting point, intrinsic viscosity and nitrogen content respectively about 240° C., 0.27 and 12.3%, which had no fibre-forming properties.

60 parts by weight of Intermediate G and 40 parts by weight of Intermediate F (see Example 11) were heated under nitrogen for 6 hours at 200–210° C. in an amount of metacresol equal to the combined weight of the reactants. After precipitation as described in Example 1 a semi-fibrous mass was obtained, having melting point 220–225° C., intrinsic viscosity about 0.45, nitrogen content about 19.5%, and good fibre-forming properties. Its solubility properties were similar to those given in Example 11.

Example 13

Hexamethylene diammonium adipate was mixed with various proportions of a polyaminotriazole (intrinsic viscosity about 0.17), prepared from sebacic dihydrazide, and heated under nitrogen for 3 hours at 210° C. in an amount of metacresol equal to the combined weight of the reactants. The resulting solutions were poured into excess acetone, the precipitates redissolved in formic acid and reprecipitated by pouring into dilute aqueous alkali, and the products washed free from salts and dried. The proportions of reactants and the properties of the products are shown in the following table:

| Hexamethylene diammonium adipate, parts by weight | Polyaminotriazole, parts by weight | Product | | |
|---|---|---|---|---|
| | | Nature | Melting Point, °C. | Intrinsic Viscosity |
| 98 | 2 | Fibrous mass (rather hard) | 250–252 | about 0.77 |
| 95 | 5 | Soft fibrous mass | about 240 | about 0.90 |
| 90 | 10 | ----do---- | about 222 | about 0.69 |
| 50 | 50 | Powdery solid | about 200 | about 0.57 |

All the products had very good fibre-forming properties and had solubility properties similar to those given in Example 7.

Example 14

143 parts by weight of a triazole bis-valeric acid, prepared as described above, and 58 parts by weight of hexamethylene diamine were heated under nitrogen for 5 hours at 210° C. in an amount of metacresol equal to the combined weight of the reactants. A polymer was precipitated from the resulting solution as described in Example 1 and, after washing and drying, was found to have a melting point above 280° C., softening point about 170° C. and nitrogen content about 19.1%, and to yield filaments from the melt. It was insoluble in acetone, fairly soluble in methanol, and soluble in hot water, cresol and formic acid.

*Example 15*

Two molecular proportions of hexamethylene diamine were condensed with one molecular proportion of adipic diester to yield the substance

NH₂.(CH₂)₆.NH.CO.(CH₂)₄.CO.NH.(CH₂)₆.NH₂

("Intermediate H").

10 parts by weight of Intermediate H and 20 parts by weight of the polyaminotriazole of Example 13 were heated under nitrogen for 10 minutes at 260° C. to produce a clear melt, and the temperature was then allowed to fall to 220° C. over ¼ hour while the pressure was reduced to 5 mm. After about 10 minutes, resolidification commenced, and the temperature was raised to 240° C. and maintained for 1 hour. The cooled product was an opaque, fairly tough mass, melting point 225–230° and nitrogen content about 20.6%. Its solubility properties were similar to those given in Example 7. Good filaments, which could be cold-drawn, were obtainable from the melt.

*Example 16*

20 parts by weight of Intermediate H (see Example 15) and 30 parts by weight of a polyaminotriazole (intrinsic viscosity about 0.17), prepared from adipic dihydrazide, were heated under nitrogen for 10 minutes at 260° C. to produce a clear melt, and then maintained at 250–260° C. and 5 mm. pressure for 25 minutes. On cooling, a hard, brittle, glassy polymer was obtained, which had melting point 210–215° C. and intrinsic viscosity about 0.62, and which yielded filaments from the melt. It was insoluble in water and acetone, and soluble in boiling methanol, cresol and formic acid.

The invention includes the production of filaments, films and other articles from the polymers produced as described above. Generally the most suitable method of producing filaments is by melt spinning, i. e. by extruding a melt of the polymer through suitable orifices. In general the temperature of the polymer to be extruded should be some 10–30° above the melting point of the polymer. This melting temperature may be modified to some extent, e. g. with a view to reducing any tendency to decomposition during spinning at very high temperatures, by mixing the polymer with suitable proportions of plasticisers, for example sulphonamide plasticisers, phenolic plasticisers, urea and thiourea plasticisers. Such plasticisers may either be left in the products or may be partially or completely extracted therefrom. Filaments may also be produced by wet or dry spinning methods from solutions in suitable solvents, for example formic acid or acetic acid or the phenolic solvents referred to above.

The filaments so formed may, if the polymer be of sufficiently high molecular weight, be drawn out at comparatively low temperatures, or even at atmospheric temperature, to very fine filaments having high tenacity and good elasticity. The resulting filaments may then be used for any of the purposes to which artificial silks have in the past been applied. Generally the products have an affinity for the dispersed insoluble type of dyestuff now generally applied to cellulose acetate, and also exhibit a good affinity for the acid wool colours.

While the invention is especially directed to the manufacture and application of fibre-forming polymers, it is not limited thereto and embraces the production of similar polymers suitable, for example, for use as softening agents, coatings, film-forming substances, and the like. Moreover, for these applications the polymers of the present invention may be mixed with other fibre-forming, film-forming or lacquer substances or other ingredients, for example cellulose acetate, aceto-butyrate and aceto-stearate, ethyl cellulose, oxyethyl cellulose, oxyethyl cellulose acetate, benzyl cellulose and other cellulose derivatives, plasticisers or softening agents, dyestuffs, pigments and the like. It will be noted that in Examples 1 to 14 the polymerization is carried out with the reagents in solution, and in Examples 15 and 16 with the reagents in the molten state. The expression "liquid phase" is used in the claims to connote that the reagents are molten or in solution in a liquid solvent.

Having described our invention, what we desire to secure by Letters Patent is:

1. Process for the production of synthetic linear polymers from a linear poly-1.2.4-triazole, which is obtained by heating a reaction mixture, which on complete hydrolysis contains a mixture of a dicarboxylic acid free from reactive groups other than the carboxy groups and a base selected from the group consisting of hydrazine and mixtures of hydrazine and ammonia, when hydrazine is the base there being present more than 2 moles of hydrazine for each mole of dicarboxylic acid, the excess of hydrazine above 2 moles for each mole of dicarboxylic acid being in amount sufficient to produce a polymer resistant to hydrolysis by hydrochloric acid, and when a mixture of hydrazine and ammonia is the base there being present more than 2 moles of hydrazine and ammonia together for each mole of dicarboxylic acid and more than 1 mole of hydrazine for each mole of dicarboxylic acid, the excess of hydrazine and ammonia above 2 moles for each mole of dicarboxylic acid and the excess of hydrazine above 1 mole for each mole of dicarboxylic acid being in an amount sufficient to produce a polymer resistant to hydrolysis by hydrochloric acid, which comprises heating said poly-1.2.4-triazole with a bifunctional carboxylic-amide-forming substance containing functional groups complementary to terminal groups of said poly-1.2.4-triazole and selected from the group consisting of diamines, dicarboxylic acids, monoamino-monocarboxylic acids and carboxylic-amide-forming derivatives thereof having at least one hydrogen atom attached to the nitrogen of each amino group and free from reactive groups other than the carboxylic-amide-forming groups, the reaction being carried out with the reaction mass in the liquid phase and being terminated while it is still liquid.

2. Process for the production of synthetic linear polymers from a linear poly-1.2.4-triazole of intrinsic viscosity up to 0.9, which is obtained by heating a reaction mixture, which on complete hydrolysis contains a mixture of a dicarboxylic acid free from reactive groups other than the carboxy groups and a base selected from the group consisting of hydrazine and mixtures of hydrazine and ammonia, when hydrazine is the base there being present more than 2 moles of hydrazine for each mole of dicarboxylic acid, the excess of hydrazine above 2 moles for each mole of dicarboxylic acid being in amount sufficient to produce a polymer resistant to hydrolysis by hydrochloric acid, and when a mixture of hydrazine and ammonia is the base there being present more than 2 moles of hydrazine and ammonia together for each mole of dicarboxylic acid and more than 1 mole of hydrazine for each mole of dicarboxylic acid, the excess of hydrazine and ammonia above 2 moles for each mole of dicarboxylic acid and the excess of hydrazine above 1 mole for each mole of dicarboxylic acid being in an amount sufficient to produce a polymer resistant to hydrolysis by hydrochloric acid, which comprises heating said poly-1.2.4-triazole with a bifunctional carboxylic-amide-forming substance containing functional groups complementary to terminal groups of said poly-1.2.4-triazole and selected from the group consisting of diamines, dicarboxylic acids, monoamino-monocarboxylic acids and carboxylic-amide-forming derivatives thereof having at least one hydrogen atom attached to the nitrogen of each amino group and free from reactive groups other than the carboxylic-amide-forming groups, the reaction being carried out with the reaction mass in the liquid phase and being terminated while it is still liquid.

3. Process for the production of synthetic linear polymers from a linear poly-4-amino-1.2.4-triazole, which is obtained by heating a reaction mixture, which on complete hydrolysis contains a mixture of a dicarboxylic acid free from reactive groups other than the carboxy groups and hydrazine, there being present more than 2 moles of hydrazine for each mole of dicarboxylic acid, the excess of hydrazine above 2 moles for each mole of dicarboxylic acid being in amount sufficient to produce a polymer resistant to hydrolysis by hydrochloric acid, which comprises heating said poly-4-amino-1.2.4-triazole with a bifunctional carboxylic-amide-forming substance containing functional groups complementary to terminal groups of said poly-4-amino-1.2.4-triazole and selected from the group consisting of diamines, dicarboxylic acids, monoamino-monocarboxylic acids and carboxylic-amide-forming derivatives thereof having at least one hydrogen atom attached to the nitrogen of each amino group and free from reactive groups other than the carboxylic-amide-forming groups, the reaction being carried out with the reaction mass in the liquid phase and being terminated while it is still liquid.

4. Process for the production of synthetic linear polymers from a linear poly-4-amino-1.2.4-triazole of intrinsic viscosity up to 0.9, which is obtained by heating a reaction mixture, which on complete hydrolysis contains a mixture of a dicarboxylic acid free from reactive groups other than the carboxy groups and hydrazine, there being present more than 2 moles of hydrazine for each mole of dicarboxylic acid, the excess of hydrazine above 2 moles for each mole of dicarboxylic acid being in amount sufficient to produce a polymer resistant to hydrolysis by hydrochloric acid, which comprises heating said poly-4-amino-1.2.4-triazole with a bifunctional carboxylic-amide-forming substance containing functional groups complementary to terminal groups of said poly-4-amino-1.2.4-triazole and selected from the group consisting of diamines, dicarboxylic acids, monoamino-monocarboxylic acids and carboxylic-amide-forming derivatives thereof having at least one hydrogen atom attached to the nitrogen of each amino group and free from reactive groups other than the carboxylic-amide-forming groups, the reaction being carried out with the reaction mass in the liquid phase and being terminated while it is still liquid.

5. Process for the production of synthetic linear polymers from a linear poly-1.2.4-triazole, which is obtained by heating a reaction mixture, which on complete hydrolysis contains a mixture of a dicarboxylic acid free from reactive groups other than the carboxy groups and a base selected from the group consisting of hydrazine and mixtures of hydrazine and ammonia, when hydrazine is the base there being present more than 2 moles of hydrazine for each mole of dicarboxylic acid, the excess of hydrazine above 2 moles for each mole of dicarboxylic acid being in amount sufficient to produce a polymer resistant to hydrolysis by hydrochloric acid, and when a mixture of hydrazine and ammonia is the base there being present more than 2 moles of hydrazine and ammonia together for each mole of dicarboxylic acid and more than 1 mole of hydrazine for each mole of dicarboxylic acid, the excess of hydrazine and ammonia above 2 moles for each mole of dicarboxylic acid and the excess of hydrazine above 1 mole for each mole of dicarboxylic acid being in an amount sufficient to produce a polymer resistant to hydrolysis by hydrochloric acid, which comprises heating said poly-1.2.4-triazole with a bifunctional carboxylic-amide-forming linear polycarboxylamide containing two terminal amino groups complementary to terminal groups of said poly-1.2.4-triazole and free from reactive groups other than the carboxylic-amide-forming groups, there being at least one hydrogen atom attached to the nitrogen of each amino group, the reaction being carried out with the reaction mass in the liquid phase and being terminated while it is still liquid.

6. Process for the production of synthetic linear polymers from a linear poly-1.2.4-triazole of intrinsic viscosity up to 0.9, which is obtained by heating a reaction mixture, which on complete hydrolysis contains a mixture of a dicarboxylic acid free from reactive groups other than the carboxy groups and a base selected from the group consisting of hydrazine and mixtures of hydrazine and ammonia, when hydrazine is the base there being present more than 2 moles of hydrazine for each mole of dicarboxylic acid, the excess of hydrazine above 2 moles for each mole of dicarboxylic acid being in amount sufficient to produce a polymer resistant to hydrolysis by hydrochloric acid, and when a mixture of hydrazine and ammonia is the base there being present more than 2 moles of hydrazine and ammonia together for each mole of dicarboxylic acid and more than 1 mole of hydrazine for each mole of dicarboxylic acid, the excess of hydrazine and ammonia above 2 moles for each mole of dicarboxylic acid and the excess of hydrazine above 1 mole for each mole of dicarboxylic acid being in an amount sufficient to produce a polymer resistant to hydrolysis by hydrochloric acid, which comprises heating said poly-1.2.4-triazole with a bifunctional carboxylic-amide-forming linear polycarboxylamide containing two terminal amino groups complementary to terminal groups of said poly-1.2.4-triazole and free from reactive groups other than the carboxylic-amide-forming groups, there being at least one hydrogen atom attached to the nitrogen of each amino group, the reaction being carried out with the reaction mass in the liquid phase and being terminated while it is still liquid.

7. Process for the production of synthetic linear condensation polymers from a linear poly-4-amino-1.2.4-triazole, which is obtained by heating a reaction mixture containing a dihydrazide of a polymethylene dicarboxylic acid free from reactive groups other than the carboxy groups with sufficient hydrazine to produce a polymer resistant to hydrolysis by boiling hydrochloric acid, which comprises heating said poly-4-amino-1.2.4-triazole with a bifunctional carboxylic - amide - forming substance containing functional groups complementary to terminal groups of said poly-4-amino-1.2.4-triazole and selected from the group consisting of diamines, dicarboxylic acids, monoamino-monocarboxylic acids and carboxylic-amide-forming derivatives thereof having at least one hydrogen atom attached to the nitrogen of each amino group and free from reactive groups other than the carboxylic-amide-forming groups, the reaction being carried out with the reaction mass in the liquid phase and being terminated while it is still liquid.

8. Process for the production of synthetic linear condensation polymers from a linear poly-4-amino-1.2.4-triazole of intrinsic viscosity up to 0.9, which is obtained by heating a reaction mixture containing a dihydrazide of a polymethylene dicarboxylic acid free from reactive groups other than the carboxy groups with sufficient hydrazine to produce a polymer resistant to hydrolysis by boiling hydrochloric acid, which comprises heating said poly-4-amino-1.2.4-triazole with a bifunctional carboxylic-amide-forming substance containing functional groups complementary to terminal groups of said poly-4-amino-1.2.4-triazole and selected from the group consisting of diamines, dicarboxylic acids, monoamino-monocarboxylic acids and carboxylic-amide-forming derivatives thereof having at least one hydrogen atom attached to the nitrogen of each amino group and free from reactive groups other than the carboxylic-amide-forming groups, the reaction being carried out with the reaction mass in the liquid phase and being terminated while it is still liquid.

9. Process for the production of synthetic linear polymers from a linear poly-1.2.4-triazole, which is obtained by heating a reaction mixture, which on complete hydrolysis contains a mixture of a polymethylene dicarboxylic acid free from reactive groups other than the carboxy groups and a base selected from the group consisting of hydrazine and mixtures of hydrazine and ammonia, when hydrazine is the base there being present more than 2 moles of hydrazine for each mole of dicarboxylic acid, the excess of hydrazine above 2 moles for each mole of dicarboxylic acid being in amount sufficient to produce a polymer resistant to hydrolysis by hydrochloric acid, and when a mixture of hydrazine and ammonia is the base there being present more than 2 moles of hydrazine and ammonia together for each mole of hydrazine and ammonia together for each mole of dicarboxylic acid and more than 1 mole of hydrazine for each mole of dicarboxylic acid, the excess of hydrazine and ammonia above 2 moles for each mole of dicarboxylic acid and the excess of hydrazine above 1 mole for each mole of dicarboxylic acid being in an amount sufficient to produce a polymer resistant to hydrolysis by hydrochloric acid, which comprises heating said poly-1.2.4-triazole with a bifunctional carboxylic-amide-forming substance containing functional groups complementary to terminal groups of said poly-1.2.4-triazole and selected from the group consisting of diamines, dicarboxylic acids, monoamino-monocarboxylic acids and carboxylic-amide-forming derivatives thereof having at least one hydrogen atom attached to the nitrogen of each amino group and free from reactive groups other than the carboxylic-amide-forming groups, the reaction being carried out with the reaction mass in the liquid phase and being terminated while it is still liquid.

10. Process for the production of synthetic linear polymers from a linear poly-1.2.4-triazole, which is obtained by heating a reaction mixture, which on complete hydrolysis contains a mixture of a dicarboxylic acid free from reactive groups other than the carboxy groups and a base selected from the group consisting of hydrazine and mixtures of hydrazine and ammonia, when hydrazine is the base there being present more than 2 moles of hydrazine for each mole of dicarboxylic acid, the excess of hydrazine above 2 moles for each mole of dicarboxylic acid being in amount sufficient to produce a polymer resistant to hydrolysis by hydrochloric acid, and when a mixture of hydrazine and ammonia is the base there being present more than 2 moles of hydrazine and ammonia together for each mole of dicarboxylic acid and more than 1 mole of hydrazine for each mole of dicarboxylic acid, the excess of hydrazine and ammonia above 2 moles for each mole of dicarboxylic acid and the excess of hydrazine above 1 mole for each mole of dicarboxylic acid being in an amount sufficient to produce a polymer resistant to hydrolysis by hydrochloric acid, which comprises heating said poly-1.2.4-triazole with a bifunctional carboxylic-amide-forming linear polycarboxylamide containing two terminal amino groups complementary to terminal groups of said poly-1.2.4-triazole and free from reactive groups other than the carboxylic-amide-forming groups, there being at least one hydrogen atom attached to the nitrogen of each amino group, said polycarboxylamides being the condensation products of polymethylene diamines with polymethylene dicarboxylic acids, the reaction being carried out with the reaction mass in the liquid phase and being terminated while it is still liquid.

11. Process for the producton of synthetic linear polymers from a linear poly-1.2.4-triazole, which is obtained by heating a reaction mixture, which on complete hydrolysis contains a mixture of a polymethylene dicarboxylic acid free from reactive groups other than the carboxy groups and a base selected from the group consisting of hydrazine and mixtures of hydrazine and ammonia, when hydrazine is the base there being present more than 2 moles of hydrazine for each mole of dicarboxylic acid, the excess of hydrazine above 2 moles for each mole of dicarboxylic acid being in amount sufficient to produce a polymer resistant to hydrolysis by hydrochloric acid, and when a mixture of hydrazine and ammonia is the base there being present more than 2 moles of hydrazine and ammonia together for each mole of dicarboxylic acid and more than 1 mole of hydrazine for each mole of dicarboxylic acid, the excess of hydrazine and ammonia above 2 moles for each mole of dicarboxylic acid and the excess of hydrazine above 1 mole for each mole of dicarboxylic acid being in an amount sufficient to produce a polymer resistant to hydrolysis by hydrochloric acid, which comprises heating said poly-1.2.4-triazole with a bifunctional carboxylicamide-forming linear polycarboxylamide containing two terminal amino groups complementary to terminal groups of said poly-1,2,4-triazole and free from reactive groups other than the carboxylic amide-forming groups, there being at least one hydrogen atom attached to the nitrogen of each amino group, said polycarboxylamides being the condensation products of polymethylene diamines with polymethylene dicarboxylic acids, the reaction being carried out with the reaction mass in the liquid phase and being terminated while it is still liquid.

JAMES WOTHERSPOON FISHER.
EDWARD WILLIAM WHEATLEY.

REFERENCES CITED

The following references are of record in the file of this patent:

UNITED STATES PATENTS

| Number | Name | Date |
|---|---|---|
| 2,332,303 | D'Alelio | Oct. 19, 1943 |
| 2,349,979 | Moldenhauer et al. | May 30, 1944 |
| 2,395,642 | Prichard | Feb. 26, 1946 |